US010594695B2

(12) United States Patent
Tarkoma

(10) Patent No.: US 10,594,695 B2
(45) Date of Patent: Mar. 17, 2020

(54) AUTHENTICATION ARRANGEMENT

(75) Inventor: Sasu Tarkoma, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 236 days.

(21) Appl. No.: 12/747,466

(22) PCT Filed: Dec. 10, 2007

(86) PCT No.: PCT/FI2007/050672
§ 371 (c)(1),
(2), (4) Date: Jun. 10, 2010

(87) PCT Pub. No.: WO2009/074709
PCT Pub. Date: Jun. 18, 2009

(65) Prior Publication Data
US 2010/0281530 A1    Nov. 4, 2010

(51) Int. Cl.
*H04L 29/06* (2006.01)
*G06F 21/33* (2013.01)
*G06F 21/30* (2013.01)

(52) U.S. Cl.
CPC ........ *H04L 63/0884* (2013.01); *G06F 21/305* (2013.01); *G06F 21/335* (2013.01); *H04L 63/0807* (2013.01); *H04L 63/0815* (2013.01)

(58) Field of Classification Search
CPC ....... H04L 63/08; H04L 9/08; H04L 63/0884; H04L 63/0807; H04L 63/0815; H04L 9/32; H04L 9/00; G06F 21/305; G06F 21/335; G06F 15/16; G06F 21/00; G06F 17/30; G06F 7/04; G06F 7/58; G06K 19/00; G06K 9/00; H04K 1/00
See application file for complete search history.

(56) References Cited

U.S. PATENT DOCUMENTS

| | | | | |
|---|---|---|---|---|
| 5,175,851 | A | * | 12/1992 | Johnson .............. G06F 16/1844 |
| 5,657,471 | A | * | 8/1997 | Lary .................... G06F 12/0292 |
| | | | | 711/154 |
| 5,944,824 | A | | 8/1999 | He |

(Continued)

FOREIGN PATENT DOCUMENTS

| WO | 2006008306 A1 | 1/2006 |
|---|---|---|
| WO | 2007068716 A1 | 6/2007 |

OTHER PUBLICATIONS

Eap, Ty Mey et al., "Enabling User Control with Personal Identity Management", 2007, IEEE International Conference on Services Computing (SCC 2007).*

(Continued)

*Primary Examiner* — Thanhnga B Truong
(74) *Attorney, Agent, or Firm* — Harrington & Smith

(57) ABSTRACT

A method, a proxy, a device, a system, and a computer program product for enabling authentication is provided. Authentication is enabled by receiving by a proxy a security token from an authentication provider, the security token including authentication information, receiving by the proxy an authentication request directed to the authentication provider or to the proxy, determining by the proxy whether the authentication information corresponds to the authentication request, and in case the authentication information corresponds to the authentication request, providing by the proxy the security token as a response to the authentication request.

18 Claims, 3 Drawing Sheets

(56) References Cited

U.S. PATENT DOCUMENTS

| | | | |
|---|---|---|---|
| 6,178,511 B1 | 1/2001 | Cohen et al. | |
| 6,240,512 B1 | 5/2001 | Fang et al. | |
| 6,898,199 B1 | 3/2005 | Silva et al. | |
| 7,016,959 B2 | 3/2006 | Dinh et al. | |
| 7,221,935 B2 | 5/2007 | Barriga-Caceres et al. | |
| 7,533,133 B1* | 5/2009 | Lanzatella | G06F 21/6218 |
| 2002/0031230 A1 | 3/2002 | Sweet et al. | 380/278 |
| 2002/0144119 A1 | 10/2002 | Benantar | |
| 2003/0163733 A1 | 8/2003 | Barriga-Caceres et al. | |
| 2003/0195970 A1 | 10/2003 | Dinh et al. | |
| 2003/0226036 A1* | 12/2003 | Bivens et al. | 713/201 |
| 2004/0034774 A1* | 2/2004 | Le Saint | 713/169 |
| 2004/0117493 A1 | 6/2004 | Bazot et al. | |
| 2004/0199795 A1 | 10/2004 | Grewal et al. | |
| 2004/0267870 A1 | 12/2004 | Rozmus et al. | |
| 2004/0268152 A1* | 12/2004 | Xia | H04L 63/0281 726/5 |
| 2005/0055555 A1 | 3/2005 | Rao et al. | |
| 2005/0177730 A1 | 8/2005 | Davenport et al. | |
| 2005/0228812 A1* | 10/2005 | Hansmann | G06F 16/258 |
| 2005/0278547 A1* | 12/2005 | Hyndman et al. | 713/185 |
| 2006/0005237 A1* | 1/2006 | Kobata et al. | 726/12 |
| 2006/0021018 A1* | 1/2006 | Hinton et al. | 726/10 |
| 2006/0041933 A1 | 2/2006 | Yakov et al. | |
| 2006/0130140 A1* | 6/2006 | Andreev et al. | 726/23 |
| 2006/0195586 A1* | 8/2006 | Stoyanov et al. | 709/227 |
| 2006/0218630 A1 | 9/2006 | Pearson et al. | |
| 2006/0248577 A1 | 11/2006 | Beghian et al. | |
| 2006/0265740 A1 | 11/2006 | Clark et al. | |
| 2007/0006291 A1 | 1/2007 | Barari et al. | |
| 2007/0130343 A1* | 6/2007 | Pardo-Blazquez et al. | 709/227 |
| 2007/0143829 A1* | 6/2007 | Hinton et al. | 726/5 |
| 2007/0157298 A1 | 7/2007 | Dingwall et al. | |
| 2007/0226785 A1* | 9/2007 | Chow et al. | 726/8 |
| 2007/0234408 A1* | 10/2007 | Burch et al. | 726/6 |
| 2007/0245414 A1* | 10/2007 | Chan | H04L 63/0823 726/12 |
| 2007/0283424 A1* | 12/2007 | Kinser et al. | 726/5 |
| 2008/0263649 A1* | 10/2008 | Smadja | G06F 21/34 726/9 |
| 2008/0288648 A1* | 11/2008 | Schneider | H04L 63/083 709/229 |
| 2009/0144456 A1* | 6/2009 | Gelf et al. | 710/8 |
| 2009/0328166 A1* | 12/2009 | Burch et al. | 726/6 |
| 2010/0115598 A1* | 5/2010 | Barriga et al. | 726/8 |
| 2011/0289553 A1* | 11/2011 | Carter et al. | 726/1 |
| 2012/0060025 A1* | 3/2012 | Cahill | 713/155 |

OTHER PUBLICATIONS

International Search Report and Written Opinion of the International Searching Authority for PCT/FI2007/050672, dated Aug. 18, 2008, pp. 1-17.

Jeong et al., "An XML-based single sign-on scheme supporting mobile and home network service environments", IEEE Transactions on Consumer Electronics. Issue 4, vol. 50. Nov. 2004.

Pfitzmann et al. "Token-based web Single Signon with Enabled Clients," IBM Research Report RZ 3458 (#93844), Nov. 2002.

Samar, "Single Sign-On Using Cookies for Web applications", Proceedings of the IEEE 8th International Workshops on Enabling Technologies: Infrastructure for Collaborative Enterprises (WET ICE '99) (1999) 158-163.

Kormann et al., "Risks of the Passport Single Signon Protocol", Computer Networks, Elsevier Science Press 33 (2001) 51-58.

Soriano et al., "SHAD: A Human-Centered Security Architecture for the Plan B Operating System", Fifth Annual IEEE International Conference on Pervasive Computing and Communications (PerCom'07) pp. 272-282.

"Liberty ID-FF Implementation Guidelines", Liberty Alliance Project, 2004.

\* cited by examiner

AUTHENTICATION ARRANGEMENT

RELATED APPLICATION

This application was originally filed as PCT Application No. PCT/FI2007/050672 filed Dec. 10, 2007.

FIELD OF THE INVENTION

The present invention relates in general to authentication and in particularly, though not exclusively, to authenticating parties that request access to services in a communication system.

BACKGROUND OF THE INVENTION

Presently, there is an on-going emergence of service-oriented computing, where services are located, accessed, and provided in the Internet. Typically, these services are effected by service applications that reside and run on a number of application servers such that a user accesses one service application running on one server, other service application running on another server and so on. These services include e.g. Web services, where a client application retrieves content of Web pages from Web servers by means of the HTTP (HyperText Transmission Protocol) protocol, communication services, such as instant messaging or voice messaging that a client application uses by means of e.g. the SIP (Session Initiation Protocol) or the H.323 protocol, or application services, where applications e.g. execute tasks in remote applications by means of e.g. SOAP (Simple Object Access Protocol) messages.

Traditionally, services residing and running on the Internet have been accessed by using computers that are connected to the Internet through wired connections, such as LANs (Local Area Networks) or telephony lines by means of e.g. ISDN (Integrated Services Digital Network) or ADSL (Asymmetric Digital Subscriber Line) connections. Computers may also connect to the Internet through a wireless access network, such as WLAN (Wireless Local Area Network). As today's mobile devices and mobile telecommunication networks typically support packet data connections, such as GPRS (General Packet Radio Service) or UMTS (Universal Mobile Telecommunication System) packet data connections, mobile devices can access services on the Internet through these packet data services. A modern mobile device also supports WLAN, so the mobile device can also access the Internet through a WLAN access network in a similar manner as a computer supporting WLAN.

In addition to the increasing usage of Internet-based services, services provided in mobile or pervasive computing environments are becoming commonplace. In such environments, interconnected computing devices, such as mobile devices, access services running on other devices. The devices can be interconnected e.g. by using short-range radio communication, such as Bluetooth®.

Some services on the Internet or in the mobile or pervasive computing environment may be available to everyone wishing to access the services, meanwhile access to other services may be restricted to authorized users only. In the latter case, access to the service is typically granted after a successful authentication and authorization of a user who requests access to the service.

As noted hereinbefore, a user may access services on a number of servers and/or from a number of service providers. If the services have restricted access, the user may have to be authenticated and authorized for each service separately. The user may have different authentication credentials, such as username and password, passphrase, PIN (Personal Identification Number), security token, or certificate, for each service, and the user may have to provide the authentication credentials at the authentication phase for each service every time the user accesses the services. This is quite inconvenient, even though the submission of the authentication credentials may be facilitated by means of e.g. a smart card or a data entity, such as a digital certificate.

In order to alleviate the above described inconvenience with respect to a user having a plurality of authentication credentials, a number of techniques for Single Sign-On (SSO) have been developed. A framework for SSO has been specified e.g. by the Liberty Alliance Project in the Liberty Identity Federation Framework (ID-FF) specification.

In SSO according to the Liberty ID-FF, the management and authentication of service requesting clients is done by one or more authentication providers referred to as Identity Providers (IdP) which are separated from the services providing entities referred to as Service Providers (SP) that e.g. operate web sites or other services. This separation has a number of advantages, the most important one being that a user no longer needs to remember multiple usernames and passwords for multiple services or reuse passwords and thus compromise their security.

In a Liberty ID-FF environment, a Liberty-enabled client is initially authenticated by an Identity Provider using the client's credentials for the Identity Provider. When the client requests service from a Service Provider, the Service Provider requests authentication of the client from the Identity Provider. If an association (or federation) between the client's IdP identity and identity at the Service Provider has already been established, the IdP can confirm (assert) the client's identity to the Service Provider. In case the association or federation between the identities has not yet been established, the client may have to authenticate at the Service Provider with its credentials for the Service Provider in order for the IdP to establish the identity federation.

If a trusted circle of Service Providers that have entrusted the IdP with authenticating service requesting clients on their behalf comprises a vast number of said Service Providers, the number of authentication requests from the Service Providers to the IdP may be huge. This may cause congestion at the IdP and result in delays in responding to the authentication requests, or refusals of authentication requests, which may render Service Provider services unavailable.

SUMMARY

The present invention aims at addressing particularly, but not exclusively, the issues discussed above. According to a first aspect of the invention there is provided a method, which comprises receiving by a proxy a security token from an authentication provider, wherein the security token includes authentication information, receiving by the proxy an authentication request directed to the authentication provider or to the proxy, determining by the proxy whether the authentication information corresponds to the authentication request, and providing by the proxy the security token as a response to the authentication request in case the authentication information corresponds to the authentication request.

According to a second aspect of the invention there is provided a proxy, which comprises a communication interface configured to handle at least one communication connection of the proxy, and a processing module configured to process a security token received from an authentication provider through the communication interface, wherein the security token includes authentication information, to process an authentication request received through the communication interface, the authentication request having been directed to the authentication provider or to the proxy, to determine whether the authentication information corresponds to the authentication request, and to provide the security token through the communication interface in case the authentication information corresponds to the authentication request.

According to a third aspect of the invention there is provided a device, which comprises a communication interface unit configured to handle at least one communication connection, a processor configured to provide a proxy by receiving through the communication interface a security token from an authentication provider, the security token including authentication information, by receiving through the communication interface an authentication request, the authentication request having been directed to the authentication provider or to the proxy, by determining whether the authentication information corresponds to the authentication request, and by providing the security token as a response to the authentication request in case the authentication information corresponds to the authentication request, wherein the device further comprises a memory for storing the security token.

According to a fourth aspect of the invention there is provided a system, which comprises an authentication provider configured to perform an initial authentication, and a proxy configured to receive a security token from the authentication provider, the security token including authentication information, to receive an authentication request, the authentication request having been directed to the authentication provider or to the proxy, to determine whether the authentication information corresponds to the authentication request, and to provide the security token as a response to the authentication request in case the authentication information corresponds to the authentication request.

According to a fifth aspect of the invention there is provided a computer program product comprising programming code means configured to provide a proxy, when said computer program is executed on a computing device.

The method, the proxy, the device, the system, and the computer program product may enable balancing of load caused by authentication requests and responses thereto between an authentication provider and a proxy and/or within the authentication provider by enabling the proxy to perform authentication on behalf of the authentication provider. The authentication provider may generate security tokens and deliver them to the proxy, which may respond to authentication requests by providing security tokens as a response to the authentication requests.

Various exemplary embodiments of the present invention are defined in dependent claims appended hereto. The embodiments have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
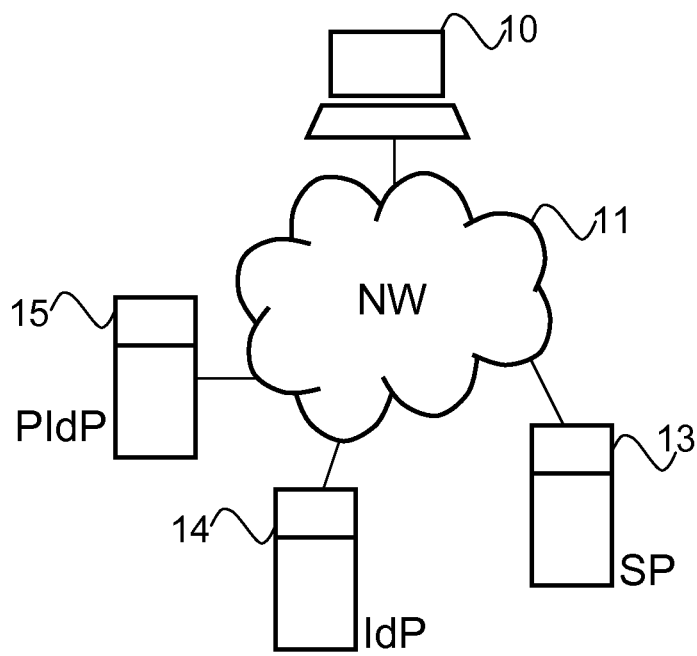
FIG. 1 shows an example of a system where an embodiment of the invention can be used.

Reference is first made to FIG. 1, which illustrates a exemplary system, in which an embodiment of the invention may be effected. The system comprises a device 10, which may comprise a computing device such as a desktop computer, laptop computer or a handheld computer, or a portable or a mobile device, such as a mobile phone. The system further comprises a Service Provider (SP) 13, an Identity Provider (IdP) 14, and a Proxy Identity Provider (PIdP) 15. The device 10, the Service Provider 13, the Identity Provider 14, and the Proxy Identity Provider are connected for communication through network (NW) 11, which may comprise e.g. wired data communication network, such as LAN or telephony network, and/or wireless data and/or telecommunication network, such as WLAN, GPRS, or UMTS.

Figure 2:
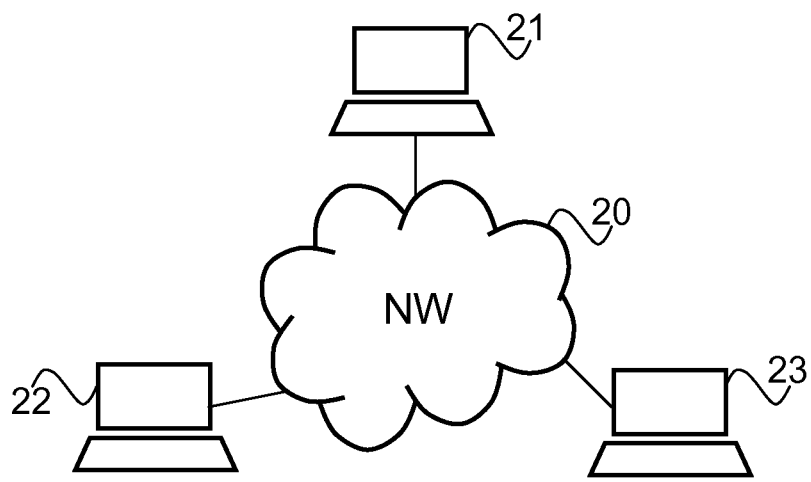
FIG. 2 depicts another example of a system where an embodiment of the invention can be used.

Reference is now made to FIG. 2, which depicts another exemplary systems in which an embodiment of the invention may be implemented. FIG. 2 outlines a mobile or pervasive computing environment, which comprises devices 21, 22, 23 corresponding to the device show in FIG. 1 referred to with reference numeral 10 and described hereinbefore. The devices 21, 22, 23 are connected through the network 20, which may comprise a short-range radio network such as a Bluetooth® network.

Figure 3:
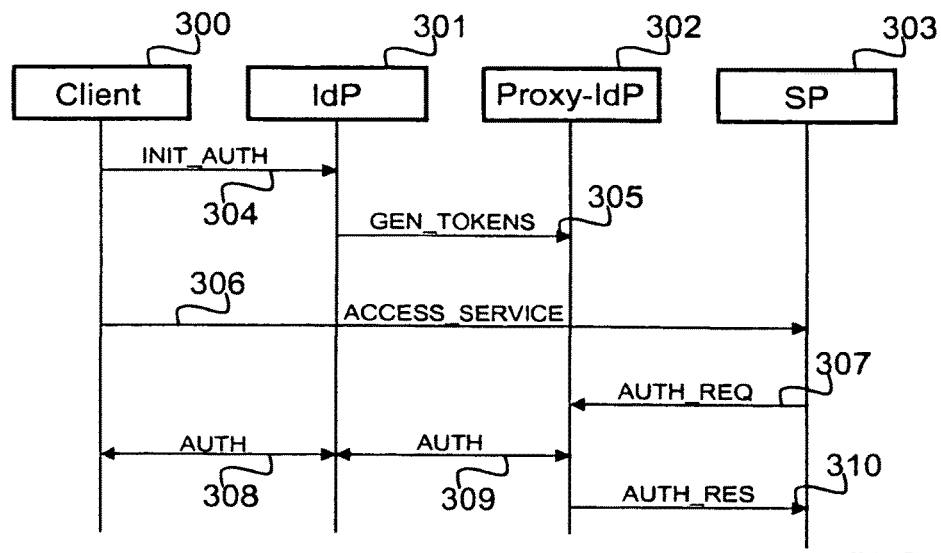
FIG. 3 shows an example of exchange of messages according to an embodiment of the invention.

Reference is now made to FIG. 3, which illustrates exchange of messages according to an embodiment of the invention in an exemplary system, such as that depicted in FIG. 1. For convenience, the embodiment shown in FIG. 3 is explained by using Liberty Alliance terminology, where applicable. The Figure shows a Liberty-enabled client 300 that supports SSO according to the Liberty ID-FF framework, an Identity Provider 301, a Proxy Identity Provider 302, and a Service Provider 303. Even though only one client, IdP, Proxy IdP, and Service Provider are shown, a skilled person appreciates that in real-life systems there may be a number of each of the named entities present together with other entities not shown in the Figure. The skilled person also appreciates that even though the entities are shown as separate entities for clarity, two or more of the entities may reside and run on the same physical device, service platform or the like.

For the purpose of describing an embodiment of the invention shown in FIG. 3 it is assumed that a Principal, e.g. a user of the device on which the client 300 is running, has established identities both at the Identity Provider 301 and the Service Provider 303, and that the Identity Provider 301 has established an identity federation for the Principal's identities at the IdP and the Service Provider. The Identity Provider may maintain the identity federation in a table or database, and assign the principal an alias identity known by both the Identity Provider 301 and the Service Provider 303.

The client 300 is initially authenticated by the Identity Provider 301. The initial authentication may be triggered e.g. by the user requesting service, such as retrieving the content of a Web page by using a Web browser, from the Service Provider 303, or the client may contact the Identity Provider 301 directly and request authentication by sending an authentication request message (INIT_AUTH) in step 304 to the Identity Provider 301.

The initial authentication of the client 300 at the Identity Provider may be performed by the Identity Provider by requesting any suitable authentication credentials, such as the Principal's user ID and its associated password, which may a one-time password (OTP), a passphrase, or a data entity, such as a software token or a digital certificate, from the client 300.

Once the client 300 has been successfully authenticated at the Identity Provider 301, the Identity Provider 301 may create a number of security tokens, which may be associated with the client 300 and the Service Provider 303, wherefrom the client 300 may request services. The number of the tokens created by the Identity Provider 301 is configurable. The security tokens may be any appropriate data entities, the format and content of which is selected according to the authentication and authorization scheme that is used by the system. For example, the security token may be a Kerberos ticket, a X.509 (PKI) certificate, or a SAML (Security Assertion Markup Language) assertion message.

The security token may comprise authentication information, e.g. an alias identity associated with the Principal's identities at the Identity Provider 301 and the Service Provider 303 and known by both of the said entities, a digital signature, a session key and the like. The security token may also comprise information determining the time period, during which the security token is valid, and information that assigns the security token to a particular service provider, such as the Service Provider 303 shown in FIG. 3.

The Identity Provider 301 may also create security tokens for the client 300 prior to the client's initial authentication at the Identity Provider 301. The Identity Provider 301 may be configured to generate security tokens in batches such that the generation of a batch of security tokens is executed in the processing resources, such as the CPU (Central Processing Unit), of the Identity Provider 301 during a time period when the processing resources are not reserved by another task. The Identity Provider 301 sends the security tokens (GEN_TOKENS) in step 305 to the Proxy Identity Provider 302. The Proxy Identity Provider 302 receives and stores the security tokens.

When the client 300 requests a service in step 306 from the Service Provider 303 that requires authentication and/or authorization of the client 300, the Service Provider 303 sends an authentication request (AUTH_REQ) in step 307 of FIG. 3. The Service Provider 303 may direct the authentication request 307 to the Identity Provider 301, which may forward the authentication request to the Proxy ID Provider 302, or the Service Provider 303 may send the authentication request 307 directly to the Proxy ID Provider 302.

After receiving the authentication request 307, the Proxy Identity Provider 302 may check, whether it has received and stored a security token for the client 300 that corresponds to the authentication request 307. For example, the Proxy Identity Provider may check whether a security token with appropriate authentication information, such as an alias identity corresponding to the identity included in the request, a digital signature, or a session key, is available. If an appropriate security token is available at the Proxy Identity Provider 302, the Proxy Identity Provider 302 sends, in step 310, the security token to the Service Provider 303 as a response to the authentication request 307. The Service Provider 303 checks the security token, and if the security token is acceptable, the Service Provider 303 deems that the client 300 has been successfully authenticated.

It may also be that the Identity Provider 301 has not established an association (identity federation) between a Principal's (e.g. a user of the client 300) identity at the Identity Provider 301 (IdP identity) and at the Service Provider 303 (SP identity). Typically, such a situation is due to the fact that the client has not yet requested any services that require authentication and authorization from the Service Provider 303. In such a situation, there may be no suitable security tokens available at the Proxy ID Provider 302, and the client 300 may be requested to authenticate itself to the Service Provider 303. The Proxy ID Provider 302 may for example send an authentication request in step 309 to the Identity Provider 301, which forwards the request to the client 300 in step 308. When the client 300 responds with the Principal's authentication credentials, e.g. a user name and a password, the Identity Provider 301 may forward the authentication credentials to the Proxy ID Provider 302, which may then forward the credentials to the Service Provider 303. As the Identity Provider 301 receives and forwards information on the Principal's SP identity from the client 300 in conjunction with the authentication response, the Identity Provider 301 may establish an identity federation between the Principal's SP identity and IdP identity.

The Proxy Identity Provider 302 may request additional security tokens from the Identity Provider 301 for example when it has exhausted all security tokens received and stored earlier, or when the earlier security tokens have expired. The Proxy Identity Provider 302 may also request additional security tokens even if earlier security tokens have not been exhausted or expired. The Proxy Identity Provider 302 may use the additional security tokens for authentication purposes in a similar manner as described herein with respect to the security tokens in general.

Figure 4:
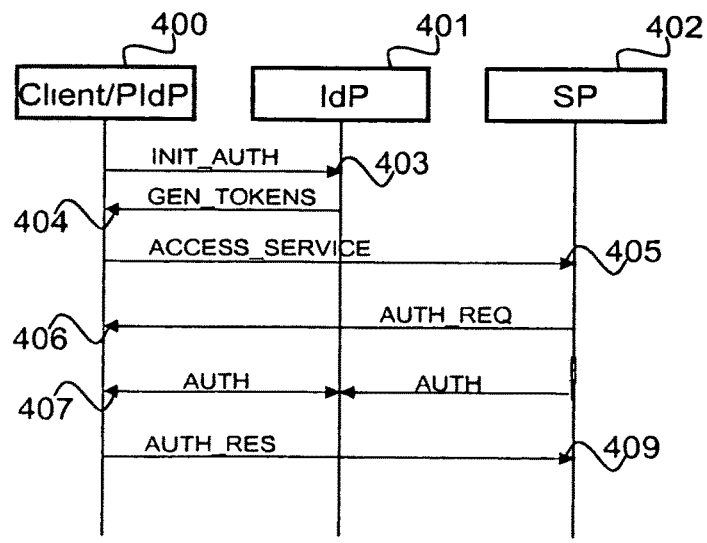
FIG. 4 shows another example of exchange of messages according to another embodiment.

Reference is now made to FIG. 4, which illustrates exchange of messages according to an embodiment of the invention in an exemplary system, where a Proxy Identity Provider (PIdP) and a client reside on the same entity, such as the device 10 described hereinbefore with reference to FIG. 1. FIG. 4 shows an entity 400 comprising a Liberty-enabled client that supports SSO according to the Liberty ID-FF framework and a Proxy Identity Provider, an Identity Provider (IdP) 401, and a Service Provider (SP) 402.

Even though FIG. 4 shows only one client/PIdP entity, IdP, and SP, a skilled person appreciates that in real-life systems there may be a number of each of the named entities present together with other entities not shown in FIG. 4. The skilled person also appreciates that even though the entities are shown as separate entities for clarity, two or more of the entities may reside and run on a common physical device or service platform.

A user of the entity 400, i.e. a Liberty Principal, authenticates himself initially at the Identity Provider 401 in step 403 by using the Liberty-enabled client of the entity 400. In a similar manner as described with reference to FIG. 3, the initial authentication may be triggered e.g. by the user requesting service, such as retrieving the content of a Web page by using a Web browser, from the Service Provider 402, or the client may contact the Identity Provider 401 directly and request authentication by sending an authentication request message (INIT_AUTH) in step 403 to the Identity Provider 401.

The initial authentication of the client/Principal at the Identity Provider 401 may be performed by the Identity Provider 401 by requesting any suitable authentication credentials, such as the Principal's user ID and its associated password, which may a one-time password (OTP), a passphrase, or a data entity, such as a software token or a digital certificate, from the client.

Once the client has been successfully authenticated at the Identity Provider 401, the Identity Provider 401 may, in step 404, create a number of security tokens in a similar manner as described with reference to FIG. 3, and send the security tokens (GEN_TOKENS) to the Proxy Identity Provider residing on the entity 400.

The security tokens created in step 404 may be similar to those described with reference to FIG. 3.

When the client of the entity 400 requests service from the Service Provider 402 in step 405, the Service Provider 402 sends an authentication request (AUTH_REQ) in step 406, if the requested service requires authentication and/or authorization of the client. The Service Provider 402 may send the authentication request to the Identity Provider 401, which forwards the request to the Proxy Identity Provider residing on the entity 400, or the Service Provider 402 may send the authentication request directly to the Proxy Identity Provider of entity 400.

After receiving the authentication request 406, the Proxy Identity Provider of the entity 400 may check, whether it has received from the Identity Provider 401 and stored a security token for the client that corresponds to the authentication request 406. For example, the Proxy Identity Provider may check whether a security token with appropriate authentication information is available. The authentication information may comprise an alias identity corresponding to the identity included in the request, a digital signature, or a session key. If an appropriate security token is available at the Proxy Identity Provider of the entity 400, the Proxy Identity Provider sends, in step 409, the security token to the Service Provider 402 as a response to the authentication request 406. The Service Provider 402 checks the security token, and if the security token is acceptable, the Service Provider 402 deems that the client of entity 400 has been successfully authenticated.

If the Proxy Identity Provider of the entity 400 does not have any security token that corresponds to the authentication request, the client of the entity 400 may have to be authenticated at the Service Provider 402. Absence of an appropriate security token may be due to the Identity Provider 401 not having established an association (identity federation) between a Principal's (e.g. a user of the client) identity at the Identity Provider 401 (IdP identity) and at the Service Provider 402 (SP identity), as described hereinbefore. In case an authentication of the client is needed, the Proxy Identity Provider of the entity 400 may for example send an authentication request in step 407 to the Identity Provider 401, which returns the request to the client residing on the entity 400. When the client responds with the Principal's authentication credentials, e.g. a user name and a password, the Identity Provider 401 may forward the authentication credentials to the Service Provider 402. As the Identity Provider 401 receives and forwards information on the Principal's SP identity from the client of the entity 400 in conjunction with the authentication response, the Identity Provider 401 may establish an identity federation between the Principal's SP identity and IdP identity.

The Proxy Identity Provider of the entity 400 may request additional security tokens from the Identity Provider of the entity 401 for example when it has exhausted all security tokens received and stored earlier, or when the earlier security tokens have expired. The Proxy Identity Provider may also request additional security tokens even if earlier security tokens have not been exhausted or expired. The Proxy Identity Provider may use the additional security tokens for authentication purposes in a similar manner as described herein with respect to the security tokens in general.

Figure 5:
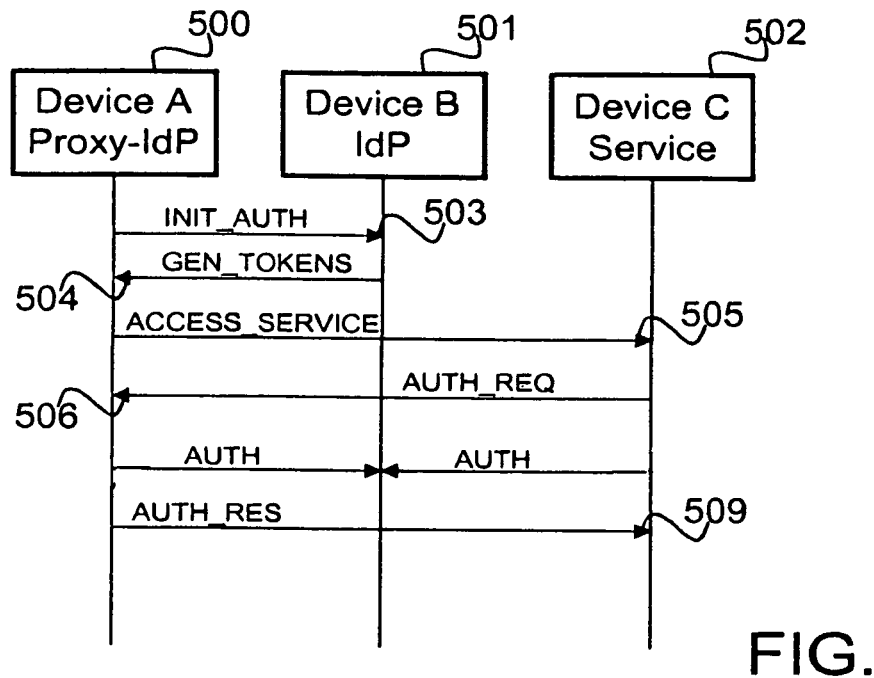
FIG. 5 shows a further example of exchange of information according to one embodiment of the invention.

Reference is now made to FIG. 5, which illustrates exchange of messages according to an embodiment of the invention in an exemplary system, such as that depicted in FIG. 2 and described hereinbefore with reference to FIG. 2. FIG. 5 shows a first device (Device A) 500 comprising a Proxy Identity Provider, a second device (Device B) 501 comprising an Identity Provider, and a third device (Device C) 502 acting as a Service Provider and providing services to the first device 500 and/or the second device 501. The first device 500 also comprises a Liberty-enabled client that supports SSO according to the Liberty ID-FF framework.

A skilled person appreciates that the second device 501 and the third device 502 may also comprise a Liberty-enabled client, and that the first and the second device 500, 501 may also act as Service Providers and provide services to the other devices in the system.

A user, i.e. a Principal, of the first device 500 authenticates initially, in step 503, by using the Liberty-enabled client of the first device 500, at the Identity Provider residing on the second device 501 as described hereinbefore with reference to FIG. 3 and FIG. 4. The Identity Provider of the second device 501 may generate a number of security tokens as described hereinbefore and send the security tokens to the Proxy Identity Provider residing on the first device 500.

When the client of the first device 500 requests a service that requires authentication and/or authorization of the client in step 505 from the third device 502, the third device 502 may send an authentication request in step 506. The third device 502 may send the authentication request 506 to the Identity Provider residing on the second device 501, which forwards the authentication request to the Proxy Identity Provider residing on the first device 500. Alternatively, the third device 502 may send the authentication request directly to the Proxy Identity Provider of the first device 500.

The Proxy Identity Provider of the first device 500 may then send a security token corresponding to the authentication request to the third device 502 as a response to the authentication request in step 509, or the client of the first device 500 may have to be authenticated at the third device 502 as described hereinbefore. An identity federation may also be established by the Identity Provider residing on the second device 501 in a manner described hereinbefore.

Figure 6:
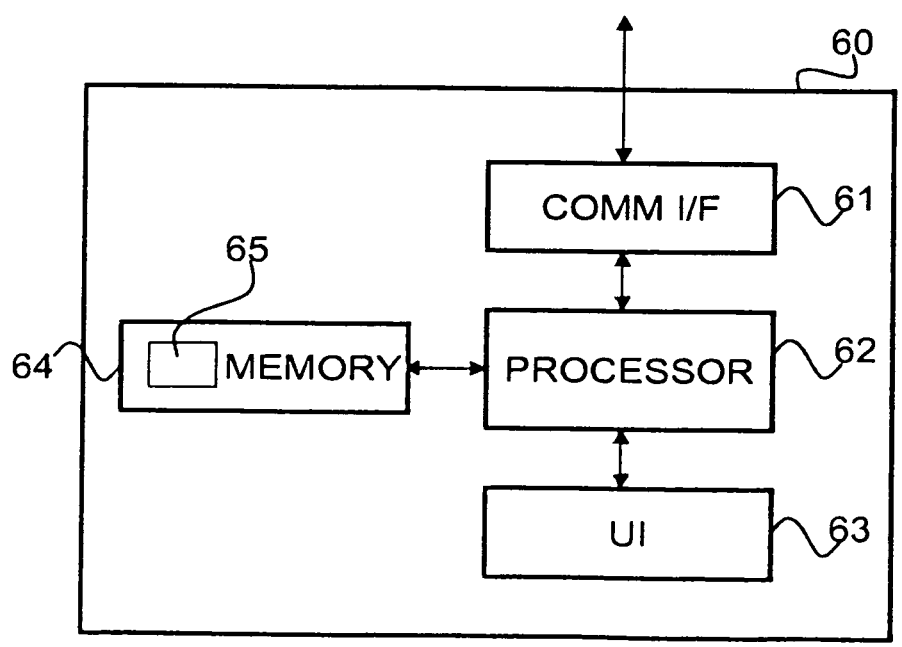
FIG. 6 outlines the architecture of a device on which some embodiments of the invention may be effected.

Reference is now made to FIG. 6, which outlines the structure of a device 60 on which an embodiment of the invention may be implemented. The device 60 may be for example a computing device, a deskside computer, a desktop computer, a portable computer, a laptop computer, a handheld computer, a Personal Digital Assistant (PDA), a mobile device, a mobile phone, or a game console.

The device 60 comprises a communication interface unit 61, a processor 62, a memory 64, and a user interface controller 63. The processor 62 is coupled to the communication interface unit 61, the memory 64, and the user interface controller 63. FIG. 6 also shows a computer program 65 stored in the memory 64. When loaded into and executed in the processor 62, the computer program 65 enables the device 60 to operate as a proxy according to an embodiment of the invention.

The communication interface unit 61 may be e.g. a radio interface module, such as a WLAN, Bluetooth, GSM/GPRS, CDMA, or WCDMA radio module, or a wired interface module, such as a LAN interface module. The communication interface unit 61 may be integrated into the device 60 or into an adapter, card or the like that may be inserted into a suitable slot or port of the device 60. The communication interface unit 61 may support one radio or wired interface technology or a plurality of technologies. FIG. 6 shows one communication interface unit 61, but the device 60 may comprise a plurality of communication interface units 61.

The processor 62 may be e.g. a central processing unit (CPU), a microprocessor, a digital signal processor (DSP), a graphics processing unit, or the like. FIG. 6 shows one processor 62, but the device 60 may comprise a plurality of processors. The device 60 may e.g. comprise a baseband processor and a multimedia processor.

The memory 64 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a memory or smart card, such as a SIM or USIM card, or the like. The device 60 may comprise a plurality of memories 64. The memory 64 may be formed as a part of the device 60 or it may be inserted into a slot, port, or the like of the device 60 by a user. The memory 64 may serve the sole purpose of storing data, or it may be effected as a part of an apparatus serving other purposes, such as processing data.

The user interface controller 63, coupled to the processor 62, may comprise circuitry for receiving input from a user of the device 60 e.g. via a keyboard, graphical user interface shown on the display of the device 60, speech recognition circuitry, or an accessory device, such as a headset, and for providing output to the user via e.g. a graphical user interface or a loudspeaker.

A skilled person appreciates that in addition to the apparatus shown in FIG. 6, the device 60 may comprise other apparatus, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

As mentioned hereinbefore, the computer program 65 enables the device 60 to operate as a proxy according to an embodiment of the invention. The computer program 65 enables the device 60 to operate for example as a Proxy Identity Provider described hereinbefore with reference to FIGS. 3 to 5. The proxy effected by the computer program 65 may comprise a communication interface configured to handle at least one communication connection of the proxy through the communication interface unit 61 of the device 60. The communication interface of the proxy may comprise program code arranged to effect socket-based communication by using a suitable Application Programming Interface (API) and access a protocol stack operational on the device 60.

The proxy may further comprise a processing module comprising program code operable to be executed in the processor 62 of the device 60 and configured to process security tokens, including authentication information, received from an Identity Provider through the communication interface, to process an authentication request originating from a Service Provider and received through the communication interface, and to determine whether the authentication information corresponds to the authentication request. If the authentication information corresponds to the authentication request, the proxy may send a security token to the Service Provider through the communication interface, as described hereinbefore with reference to FIGS. 3 to 5. The processing module may be further configured to store the security tokens in the memory 64 of the device 60.

The processing module may be further configured to request through the communication interface further authentication information from a client in case the authentication information does not correspond to the authentication request. The processing module may also be configured to request through the communication interface additional security tokens from the Identity Provider. The processing module may request additional security tokens for example when earlier received and stored security tokens have been exhausted or expired. Additional security tokens may also be requested even if earlier security tokens have not been exhausted or expired. The proxy may use the additional security tokens for authentication purposes in a similar manner as described herein with respect to the security tokens in general. Functions of the proxy have been further described hereinbefore with reference e.g. to FIGS. 3 to 5.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method comprising:
receiving with a proxy device and storing in a non-transitory memory of the proxy device a security token from an authentication provider device, the security token including authentication information, wherein the security token comprises information that allows access to a service provider and information that assigns the security token to the service provider;
after said receiving with the proxy device and storing, in the non-transitory memory of the proxy device, the security token from the authentication provider device:
receiving with the proxy device an authentication request directed to the authentication provider device or to the proxy device;
determining with the proxy device whether the authentication information corresponds to the authentication request; and
in case the authentication information corresponds to the authentication request, providing the security token from the proxy device as a response to the authentication request;
after determining with the proxy device whether the authentication information corresponds to the authentication request:
requesting a further security token from the authentication provider device;
receiving at the proxy device said further security token as a response to said request for the further security token; and
requesting additional security tokens with the proxy device in order to maintain a complement of security tokens within the proxy device in response to all security tokens received and stored being exhausted or having expired after a predetermined time interval, or in response to the proxy device having less than the complement of security tokens.

2. The method according to claim 1, wherein the security token is associated with a client the authentication provider device initially authenticated.

3. The method according to claim 1, wherein the authentication request is originated from the service provider, and wherein the proxy device receives the authentication request from the authentication provider device as a response to the authentication provider device forwarding the authentication request to the proxy device.

4. The method according to claim 1, wherein the authentication request is originated from the service provider, and wherein the proxy device receives the authentication request as a response to the service provider sending the authentication request to the proxy device.

5. The method according to claim 2, wherein the authentication request is originated as a response to the client requesting service from the service provider.

6. The method according to claim 2, wherein the authentication provider device initial authentication of the client is initiated as a response to the client requesting service from the service provider.

7. The method according to claim 2, further comprising after the proxy device determines whether the authentication information corresponds to the authentication request:
in case the authentication information does not correspond to the authentication request, the proxy device requesting further authentication information from the client;
receiving the further authentication information from the client; and
in case the further authentication information corresponds to the authentication request, the proxy device providing the security token or a further security token to the service provider.

8. The method according to claim 1, wherein the security token comprises a plurality of tokens.

9. The method according to claim 1, wherein the further security token is requested after the security token has been provided or expired.

10. The method according to claim 1, wherein the security token has been standardized in a Single Sign-On convention, a federation, a generic format, or comprises an X.509 certificate, a Kerberos ticket, or a SAML assertion.

11. An apparatus, comprising:
at least one processor and a non-transitory memory storing a set of computer instructions, in which the at least one processor and the non-transitory memory storing the computer instructions are configured to cause the apparatus at least:
to receive and store in the non-transitory memory a security token received from the authentication provider device through a communication interface, the security token including authentication information, wherein the security token comprises information that allows access to a service provider and information that assigns the security token to the service provider; and
after said receipt and storage:
to process an authentication request received through the communication interface of the apparatus, the authentication request having been directed to the authentication provider device or to the apparatus;
to determine whether the authentication information corresponds to the authentication request; and
in case the authentication information corresponds to the authentication request, to provide the security token through the communication interface;
after said determination:
requesting a further security token from the authentication provider device;
receiving with the apparatus said further security token as a response to said request for the further security token; and
requesting additional security tokens in order to maintain a complement of security tokens within the apparatus in response to all security tokens received and stored being exhausted or having expired after a predetermined time interval, or in response to the apparatus having less than the complement of security tokens.

12. The apparatus according to claim 11, wherein the security token is associated with a client the authentication provider device initially authenticated.

13. The apparatus according to claim 11, wherein the computer instructions are further configured to cause the apparatus to request through the communication interface further authentication information in case the authentication information does not correspond to the authentication request.

14. The apparatus according to claim 11, wherein the computer instructions are further configured to cause the apparatus to request through the communication interface a further security token from the authentication provider device.

15. The apparatus according to claim 13, wherein the computer instructions are further configured to cause the apparatus to:
receive through the communication interface said further authentication information;
determine whether said further authentication information corresponds to the authentication request; and
provide the security token or a further security token through the communication interface in case the further authentication information corresponds to the authentication request.

16. A computer program product embodied on a non-transitory computer readable memory comprising computer executable program code which, when executed with at least one processor of an apparatus, causes the apparatus to perform:
receiving with the apparatus and storing in a non-transitory memory of the apparatus a security token from the authentication provider device, the security token including authentication information, wherein the security token comprises information that allows access to a service provider and information that assigns the security token to the service provider; and
after said receiving and storing with the apparatus:
receiving with the apparatus an authentication request directed to the authentication provider device or to the apparatus;
determining with the apparatus whether the authentication information corresponds to the authentication request; and
in case the authentication information corresponds to the authentication request, providing the security token from the apparatus as a response to the authentication request;
after said determining with the apparatus:

requesting a further security token from the authentication provider device;

receiving at the apparatus said further security token as a response to said request for the further security token; and requesting additional security tokens with the apparatus in order to maintain a complement of security tokens within the apparatus in response to all security tokens received and stored being exhausted or having expired after a predetermined time interval, or in response to the apparatus having less than the complement of security tokens.

17. The method according to claim 1, wherein the authentication provider device is further configured to generate further security tokens such that the further security tokens are generated in batches, wherein a batch of security tokens is generated when processing resources of the authentication provider device are available.

18. The apparatus according to claim 11, wherein the authentication provider device is further configured to generate further security tokens such that the further security tokens are generated in batches, wherein a batch of security tokens is generated when processing resources of the authentication provider device are available.

* * * * *